United States Patent
Karve et al.

(10) Patent No.: US 11,947,461 B2
(45) Date of Patent: Apr. 2, 2024

(54) PREFETCH UNIT FILTER FOR MICROPROCESSOR

(71) Applicant: International Business Machines Corporation, Armonk, NY (US)

(72) Inventors: Mohit Karve, Austin, TX (US); Naga P. Gorti, Austin, TX (US); Guy L. Guthrie, Austin, TX (US); Sanjeev Ghai, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/572,245

(22) Filed: Jan. 10, 2022

(65) Prior Publication Data
US 2023/0222066 A1    Jul. 13, 2023

(51) Int. Cl.
*G06F 12/0862* (2016.01)
*G06F 12/0804* (2016.01)
*G06F 12/0817* (2016.01)
*G06F 12/0871* (2016.01)

(52) U.S. Cl.
CPC ...... *G06F 12/0862* (2013.01); *G06F 12/0804* (2013.01); *G06F 12/0817* (2013.01); *G06F 12/0871* (2013.01); *G06F 2212/1021* (2013.01)

(58) Field of Classification Search
CPC ............. G06F 12/0804; G06F 12/0817; G06F 12/0862; G06F 12/0871; G06F 2212/1021
See application file for complete search history.

(56) References Cited

U.S. PATENT DOCUMENTS

| | | | |
|---|---|---|---|
| 8,166,251 B2 | 4/2012 | Luttrell | |
| 8,977,819 B2 | 3/2015 | Chirca et al. | |
| 9,886,385 B1 | 2/2018 | Huberty et al. | |
| 9,904,624 B1* | 2/2018 | Huberty | G06F 12/0875 |
| 10,346,309 B1 | 7/2019 | Hakewill et al. | |
| 10,579,530 B2 | 3/2020 | Shwartsman et al. | |
| 10,671,394 B2 | 6/2020 | Britto et al. | |
| 2006/0248279 A1* | 11/2006 | Al-Sukhni | G06F 12/0862 |
| | | | 711/111 |

(Continued)

OTHER PUBLICATIONS

Choi et al.; "Adaptive Granuarity Based Last-Level Cache Prefetching . . . for Graph Processing Applications", Applied Sciences, Jan. 22, 2021, pp. 1-23, vol. 11, Iss. 3.

(Continued)

*Primary Examiner* — Aracelis Ruiz
(74) *Attorney, Agent, or Firm* — Scully, Scott, Murphy & Presser, P.C.

(57) ABSTRACT

A method, programming product, processor, and/or system for prefetching data is disclosed that includes: receiving a request for data at a cache; identifying whether the request for data received at the cache is a demand request or a prefetch request; and determining, in response to identifying that the request for data received at the cache is a prefetch request, whether to terminate the prefetch request, wherein determining whether to terminate the prefetch request comprises: determining how many hits have occurred for a prefetch stream corresponding to the prefetch request received at the cache; and determining, based upon the number of hits that have occurred for the prefetch stream corresponding to the prefetch request received by the cache, whether to terminate the prefetch request.

20 Claims, 5 Drawing Sheets

(56) References Cited

U.S. PATENT DOCUMENTS

| | | |
|---|---|---|
| 2010/0241811 A1* | 9/2010 | Solihin .............. G06F 12/0862 712/E9.047 |
| 2010/0268893 A1 | 10/2010 | Luttrell |
| 2013/0138887 A1* | 5/2013 | Chou ................ G06F 12/0862 711/E12.024 |
| 2015/0149714 A1* | 5/2015 | Pugsley ............. G06F 12/0811 711/137 |
| 2015/0286571 A1 | 10/2015 | Cain, III et al. |
| 2016/0041914 A1 | 2/2016 | Eckert et al. |
| 2017/0300416 A1* | 10/2017 | Yamamura .......... G06F 12/0862 |
| 2017/0344483 A1 | 11/2017 | Shwartsman et al. |
| 2018/0365156 A1* | 12/2018 | Gschwind ............ G06F 12/084 |
| 2019/0087345 A1* | 3/2019 | Hijaz ................. G06F 12/0897 |
| 2019/0114263 A1 | 4/2019 | Olorode et al. |
| 2020/0089622 A1 | 3/2020 | Heremagalur Ramaprasad et al. |
| 2020/0387381 A1 | 12/2020 | Karve et al. |
| 2020/0401523 A1 | 12/2020 | Sinha et al. |
| 2021/0342268 A1* | 11/2021 | Lloyd ................ G06F 12/0811 |

OTHER PUBLICATIONS

Michaud; "Best-Offset Hardware Prefetching", HPCA IEEE International Symposium on, Mar. 12-16, 2019, pp. 1-13.

Guo et al.; "Energy-Efficient Hardware Data Prefetching", TVLSI IEEE Transactions on, Feb. 2009, pp. 250-263, vol. 19, No. 2.

Tian et al.; "Last-Level Cache Deduplication", ICS'14 28th ACM Inetrnational Conference on, Jun. 10-13, 2014, pp. 53-62.

Seshadri et al.; "Mitigating Prefetcher-Caused Pollution Using Informed Caching Policies for Prefetched Blocks", TACO ACM Transactions on, Jan. 2015, pp. 1-22, vol. 11, Iss. 4.

* cited by examiner

PREFETCH UNIT FILTER FOR MICROPROCESSOR

BACKGROUND

The disclosure herein relates generally to handling and processing data and/or improving an information handling or data processing system, e.g., a processor, and more specifically to prefetching data and instructions in such systems.

Computing systems are being developed to increase the speed and efficiency at which computing systems are able to access data and execute increasingly complex applications. To increase the speed of executing instructions and processing data, pipelined processors have been developed which process more than one instruction at a time. Pipelining often involves processing instructions in stages and out-of-order. Multiple pipelines or execution slices within a processor core permit multiple instruction threads to be processed at the same time. One technique to increase the speed at which processors execute instructions and decrease latency in processors is to prefetch instructions and data so that the data is local to the processor before it is needed. Prefetchers typically use access patterns found using data or instruction addresses to prefetch data into some level of cache in the processor cache hierarchy. It would be advantageous if prefetching, particularly in out-of-order processors, could be handled with greater efficiency.

SUMMARY

The summary of the disclosure is given to aid understanding of information or data handling systems, for example processors, including out-of-order information handling systems and processors, and such systems that utilize prefetch units (also referred to as prefetchers) to prefetch data, from for example main memory, so that it is closer (e.g., local to) the processor core, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the techniques, methods, and/or systems for prefetching instructions.

A system, processor, programming product, and/or method is described according to one or more embodiments for processing instructions, including in one or more embodiments prefetching instructions and data in a processor. In one or more approaches a system, processor, programming product, and/or method of prefetching data and/or instructions that reduces handling of duplicate prefetch streams is disclosed. In one or more embodiments, a streaming filter is introduced that will be checked before the prefetch request is checked in the cache and/or goes out to main memory. Based upon information collected in the streaming filter, a decision will be made whether or not to terminate the prefetch request or further process the prefetch request. In one or more approaches, a system, processor, programming product, prefetch streaming filter, and/or method is disclosed that includes: receiving a request for data at a cache; identifying whether the request for data received at the cache is a demand request or a prefetch request; and determining, in response to identifying that the request for data received at the cache is a prefetch request, whether to terminate the prefetch request, wherein determining whether to terminate the prefetch request comprises: determining how many hits have occurred for a prefetch stream corresponding to the prefetch request received at the cache; and determining, based upon the number of hits that have occurred for the prefetch stream corresponding to the prefetch request received by the cache, whether to terminate the prefetch request. In one or more approaches determining whether to terminate the prefetch request is based upon a probabilistic scale where the greater the number of hits for the prefetch stream corresponding to the prefetch request, the more likely the prefetch request is terminated. The probabilistic scale in an aspect never terminates all the prefetch requests. In an embodiment, the prefetch request is terminated before a search in the cache or in a cache directory for the cache.

In one or more embodiments, the system, processor, programming product and/or method further includes identifying, in response to allocating a prefetch stream, the allocated prefetch stream with a prefetch stream identification. In an approach, determining how many hits have occurred for the prefetch stream corresponding to the prefetch request received at the cache includes checking a streaming filter to determine the number of hits that have occurred for the prefetch stream corresponding to the prefetch request. The system, processor, programming product and/or method in one or more embodiments further includes identifying, in response to allocating a prefetch stream, the allocated prefetch stream with a prefetch stream identification, wherein determining how many hits occurred for the prefetch stream corresponding to the prefetch request received at the cache comprises checking a streaming filter to determine the number of hits that have occurred for the prefetch stream corresponding to the prefetch request, wherein the streaming filter contains a plurality of entries where each entry corresponds to one of a plurality of prefetch streams and each entry tracks the number of hits that have occurred for its corresponding prefetch stream. Checking a streaming filter to determine the number of hits that have occurred for the prefetch stream corresponding to the prefetch request in a preferred aspect includes using the prefetch stream identification to identify the entry in the streaming filter to look-up for the number of hits that have occurred for the prefetch stream corresponding to the prefetch request. In a further embodiment, the system, processor, programming product, and/or method further includes determining whether data responsive to the demand request or prefetch request is in the cache. Determining whether data responsive to the prefetch request is in the cache in an embodiment includes reading, in response to not terminating the prefetch request, a cache directory for the cache, and in a further aspect determining whether data responsive to the demand request is in the cache includes reading, in response to determining that the request is a demand request and not a prefetch request, the cache directory for the cache. The system, processor, programming product, and/or method further includes determining whether the prefetch request or a demand request hits in a cache directory for the cache.

The system, processor, programming product, and/or method according to one or more embodiments further includes: sending, in response to determining data responsive to the demand request is in the cache, the data to a processor core; and terminating, in response to determining data responsive to the prefetch request is in the cache, the prefetch request and incrementing a hit count for a prefetch stream corresponding to the prefetch request. In one or more arrangements, the system, processor, programming product, and/or method further includes: sending, in response to determining data responsive to the demand request is not in the cache, the demand request to the next level of memory in a memory hierarchy; and in response to determining data responsive to the prefetch request is not in the cache, setting the hit count for a prefetch stream corresponding to the prefetch request to zero and sending the prefetch request to the next level of memory in the memory hierarchy. According to an embodiment, the system, processor, programming product, and/or method further includes: identifying whether the request for data received at the next level of memory in the memory hierarchy is a demand request or a prefetch request; and determining, in response to identifying the request for data received at the next level of memory in the memory hierarchy is a prefetch request, whether to terminate the prefetch request received at the next level of memory in the memory hierarchy, wherein determining whether to terminate the prefetch request received at the next level of memory in the memory hierarchy comprises: determining how many hits have occurred for the prefetch request stream corresponding to the prefetch request received at the next level of memory in the memory hierarchy; and determining, based upon the number of hits that have occurred for the prefetch stream corresponding to the prefetch request received at the next level of memory in the memory hierarchy, whether to terminate the prefetch request.

According to an arrangement the system and/or product includes: a cache memory for holding data; a prefetch unit for prefetching data into the cache memory, the prefetch unit having a prefetch request queue (PRQ) for tracking one or more prefetch streams; a memory subsystem for storing data, the memory subsystem having one or more data caches and a main memory; and a prefetch streaming filter having a number of entries, each entry for tracking a number of times that one of the one or more prefetch streams have hit in one of the one or more data caches. In an aspect the number of entries in the prefetch streaming filter is equal to a number of entries in the PRQ and each entry in the prefetch streaming filter corresponds to a prefetch stream identification, wherein the streaming filter is located in an instruction processing path after the processor and at least one of a group consisting of: before the data cache; and at a front end of the data cache before a data cache directory for the data cache. In an aspect, determining whether the prefetch request should be terminated further includes configuring the system and/or processor to: determine, based upon the number of hits that have occurred for the prefetch stream corresponding to the prefetch request received by the data cache, whether to terminate the prefetch request based upon a probabilistic scale where the greater the number of hits for the prefetch stream corresponding to the prefetch request, the more likely the prefetch request is terminated. In a further aspect a prefetch streaming filter for a computing system is disclosed, the prefetch streaming filter having a number of entries, each entry corresponding to an allocated prefetch stream and storing a count of a number of times a prefetch request corresponding to the allocated prefetch stream hits in a data cache, where a hit in the data cache indicates data associated with the prefetch request is in the data cache, wherein the count in an entry in the prefetch steaming filter is incremented in response to a prefetch request hitting in the data cache, and the count in the entry in the prefetch streaming filter is reset to zero in response to the prefetch request missing in the data cache, where missing in the data cache indicates that data associated with the prefetch request is not in the data cache.

The foregoing and other objects, features and advantages of the invention will be apparent from the following more particular descriptions of exemplary embodiments of the invention as illustrated in the accompanying drawings.

BRIEF DESCRIPTION OF THE DRAWINGS

The various aspects, features, and embodiments of methods, techniques, systems, processors, processor architecture, and/or programming products for processing data, including for example, microprocessors that utilize prefetchers will be better understood when read in conjunction with the figures provided. It may be noted that in the figures provided a numbered element is typically numbered according to the figure in which the element is introduced, is typically referred to by that number throughout succeeding figures, and that like reference numbers generally represent like parts of exemplary embodiments of the invention. Embodiments are provided in the figures for the purpose of illustrating aspects, features, and/or various embodiments of the methods, techniques, systems, processors, prefetch units (prefetchers), and/or programming products for processing data including for example prefetching instructions and data in, for example, microprocessors, but the claims should not be limited to the precise arrangement, structures, features, aspects, assemblies, subassemblies, systems, circuitry, functional units, programming, instructions, embodiments, methods, processes, or devices shown. The arrangements, structures, features, aspects, assemblies, subassemblies, systems, circuitry, functional units, programming, instructions, embodiments, methods, processes, and/or devices shown may be used singularly or in combination with other arrangements, structures, features, aspects, assemblies, subassemblies, systems, circuitry, functional units, programming, instructions, embodiments, methods, processes, and/or devices.

DETAILED DESCRIPTION

Figure 1:
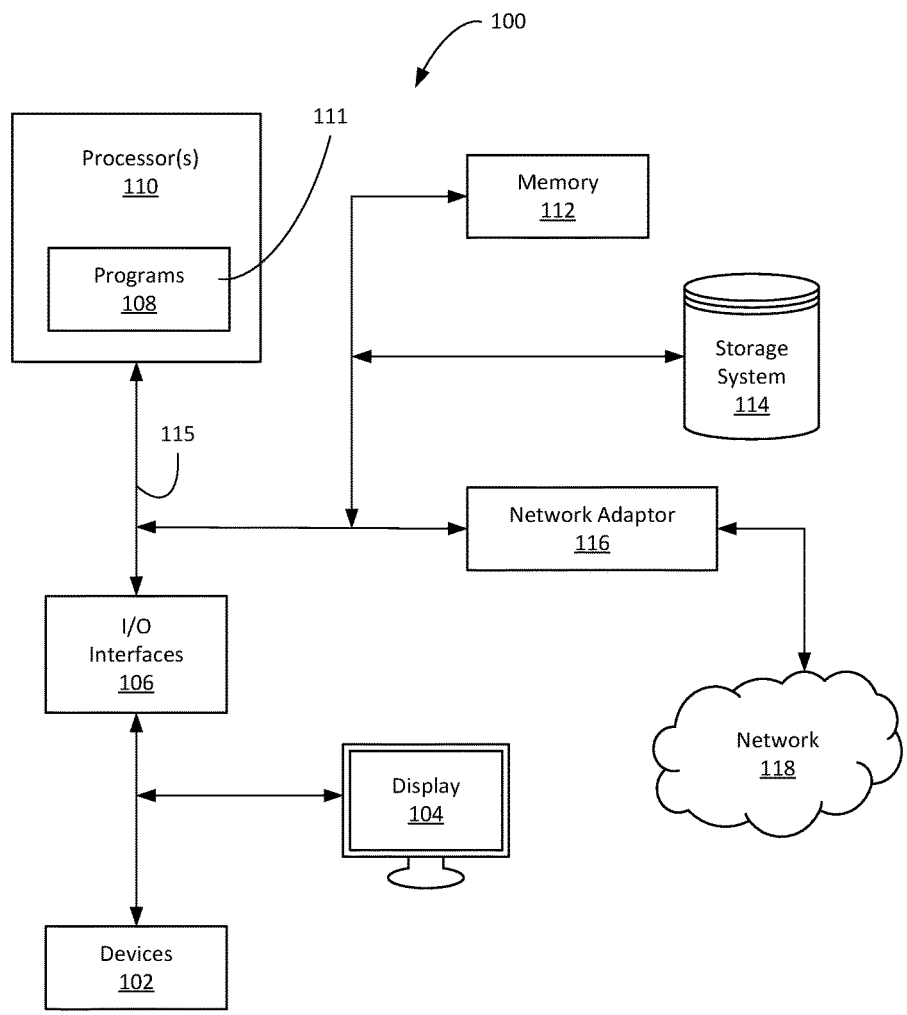
FIG. 1 schematically shows a block diagram of an exemplary computer system, including a processor, on which the present disclosure may be practiced according to an embodiment.

The following description is made for illustrating the general principles of the invention and is not meant to limit the inventive concepts claimed herein. In the following detailed description, numerous details are set forth in order to provide an understanding of methods, techniques, and systems for processing data for example in an integrated circuit, e.g., a processor, including the use of prefetching data and/or instructions, however, it will be understood by those skilled in the art that different and numerous embodiments of the systems, microprocessors, methods, and/or techniques may be practiced without those specific details, and the claims and disclosure should not be limited to the embodiments, features, aspects, assemblies, subassemblies, structures, configurations, arrangements, functional units, circuitry, prefetchers, programming, instructions, processes, methods, or details specifically described and shown herein. In addition, features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It should also be noted that, as used in the specification and the appended claims, the singular forms "a," "an" and "the" include plural referents unless otherwise specified, and that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following discussion omits or only briefly describes processing instructions and data in integrated circuits, including, for example, processors and microprocessor systems and architectures, including out-of-order processing of instructions using a prefetcher (prefetch unit), which are apparent to those skilled in the art. It is assumed that those skilled in the art are familiar with processing instructions and data in integrated circuits, including in, for example, microprocessors (also referred to as processors) that process instructions out-of-order and utilize instruction and data prefetching.

Computing demands are requiring faster and more efficient processing of instructions and data. Microprocessors have been developed to meet those demands including the development of out-of-order processors. Other techniques to increase the speed and efficiency of processors includes the use of prefetching of instructions and data so that data is local to the processor as it is needed. Modern out-of-order processors perform data prefetching based upon the appearance of load instructions at a Load-Store Unit (LSU). Due to the large out-of-order processing window these processors are able to support, load instructions appear at the Load-Store Unit (LSU) in chaotic fashion, making it hard for prefetchers to recognize patterns. The arrival of load instructions that are very far out-of-order (e.g., either very early or very late with regard to most load instructions in the stream) can cause the allocation of duplicate prefetch streams that are prefetching far ahead or far behind another existing prefetch stream. These duplicate streams generate many prefetches that are going to lead or trail an established stream. In either case, there will be a large number of prefetches at the lower-level caches (L2 cache, L3 cache and beyond) that are never sent out to main memory because they hit in the cache or match an outstanding prefetch.

These duplicate prefetches waste a lot of power and resources searching the lower-level cache (L2, L3, and beyond) directory arrays. In an example embodiment, low level caches tend to be highly associative and every look-up in the cache directory generally requires an 8-20 entry CAM compare. By removing duplicate prefetches and reducing unnecessary lookups, power savings could be achieved at the cache directories. It would be advantageous to reduce the number of look-ups and searches made by these duplicate prefetches.

Disclosed is a mechanism to collect the history of prefetches and make predictions at the L2 cache, L3 cache (and potentially lower-level caches) about whether a prefetch request is likely to hit or miss in the cache. In an embodiment, if the prefetch is predicted to hit in the cache, then the prefetch can be ignored by the cache, not looked up in the cache array (e.g., not searched in the cache directory), and not sent to memory. If the prefetch is predicted to miss in the cache, the prefetch follows the normal processing path and checks for its presence in the cache (e.g., checks the cache directory to see if the data which is the subject of the prefetch request is in the cache). If the data is not present in the cache, the prefetch request is sent to the next level of cache in the cache hierarchy, where it undergoes the same checks before finally being sent out to main memory.

In one or more approaches a streaming filter is introduced at a cache level (e.g., the L2 cache), preferably at one or more cache levels, and in an aspect at each low-level cache (e.g., L2 cache, L3 cache), that is checked before the prefetch request goes to the next cache level and/or out to main memory. In an embodiment, the prefetch streaming filter contains as many entries as there are in the prefetch request queue (PRQ) in the processor core, where the PRQ represents and tracks all the streams that the processor core is currently tracking and prefetching. Each prefetch streaming filter entry tracks the number of hits that prefetches associated with that stream have incurred since the last miss (e.g., a measure of the likelihood that the data that is the subject of the prefetch request is already in the cache). In response to a miss in the cache, the entry in the prefetch streaming filter is cleared (e.g., set to 0) and the prefetch proceeds to the next level of cache and/or to main memory. To implement the tracking performed by the streaming filter, in an embodiment, each prefetch request is identified, tagged and/or marked (e.g., includes a bit field) as related to a specific PRQ entry.

In operation, whenever a prefetch request is received by a cache, the associated prefetch streaming filter is first checked to determine how many hits have occurred for that prefetch stream. In an embodiment, each entry in the prefetch steaming filter is directly mapped to a stream identification. With the direct mapping between stream identification and entry in the prefetch streaming filter, no searching of the prefetch streaming filter is required. A decision to terminate the prefetch is made probabilistically on the basis of the number of hits, where, for example, the probability of terminating the prefetch requests increases with the number of hits. So, for example, if the prefetch streaming filter has tracked a large number of hits for a given PRQ stream, then most of the prefetch requests associated with that stream should be killed before they access the cache directory and perform a search and/or look-up in the cache directory.

In one or more embodiments, the probabilistic scale, e.g., the probability of terminating a prefetch request, is configured so that all (100%) of the prefetch requests are never stopped from going to the cache directory for searching. In other words, at no point should a 100% of prefetch requests be terminated. Low confidence prefetches are an indication of a new PRQ allocation in the core. Accordingly, in a further embodiment, zero confidence streams are a good indication of a new allocation, so those requests (and/or other low-confidence streams) are always permitted to proceed, and in an aspect, clear the hit count in the associated streaming filter entry.

FIG. 1 illustrates an example computing and/or data processing environment 100 in which aspects of the present disclosure may be practiced. It is to be understood that the computer and/or data processing environment 100 (also referred to as a computing and/or information handling system 100) depicted is only one example of a suitable computing environment and is not intended to suggest any limitation as to the scope of use or functionality of embodiments of the present invention. For example, the system shown may be operational with numerous other special-purpose computing system environments or configurations. Examples of well-known computing systems, environments, and/or configurations that may be suitable for use with the system shown in FIG. 1 may include, but are not limited to, server computer systems, mainframe computers, distributed cloud computer systems, personal computer (PC) systems, PC networks, thin clients, thick clients, minicomputer systems, laptop devices, tablets, hand-held devices, smartphones, set top boxes, smart watches, programmable consumer electronics, multiprocessor systems, microprocessor-based systems, and the like that include any of the above systems or devices, and the like.

In one or more embodiments, the computer system 100 may be described in the general context of computer system or processor executable instructions, embodied as program modules stored in memory 112, being executed by the computer system. Generally, program modules may include routines, programs, objects, components, logic, data structures, and so on that perform particular tasks and/or implement particular input data and/or data types in accordance with the present invention.

The components of the computer system 100 may include, but are not limited to, one or more processors or processing units 110, a memory 112, and a bus 115 that operably couples various system components, including memory 112 to processor 110. In one or more embodiments, the processor 110, which is also referred to as a central processing unit (CPU) or microprocessor, may execute one or more programs or modules 108, or portions of programs or modules 108, that are loaded from memory 112 to local memory 111, e.g., L1 Cache, where the program module(s) embody software (program instructions) that cause the processor to perform one or more operations. In some embodiments, module 108 may be programmed into the integrated circuits of the processor 110, loaded from memory 112, storage device 114, network 118 and/or combinations thereof to local memory 111.

The processor (or CPU) 110 can include can include one or more processor cores, the processor cores having various functional units (instruction fetch units, decode units, dispatch units, mappers, issue units, history buffers), registers, buffers, execution units, caches, memories, and other units formed by integrated circuitry that will be described in more detail herein, and may operate according to reduced instruction set computing ("RISC") techniques. The processor 110 processes data according to processor cycles, synchronized, in one or more aspects, to an internal clock (not shown). Bus 115 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture bus, Micro Channel Architecture (MCA) bus, Enhanced ISA (EISA) bus, Video Electronics Standards Association (VESA) local bus, and Peripheral Component Interconnects (PCI) bus. The computer system 100 may include a variety of computer system readable media, including non-transitory readable media. Such media may be any available media that is accessible by the computer system 100, and it may include both volatile and non-volatile media, removable and non-removable media.

Memory 112 (sometimes referred to as system or main memory) can include computer readable media in the form of volatile memory, such as random-access memory (RAM), cache memory and/or other forms. Computer system may further include other removable/non-removable, volatile/non-volatile computer system storage media. By way of example only, storage system 114 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. Memory 112 and/or storage system 114 can include flash memory (e.g., EEPROM) and can be arranged in a solid-state drive (SSD). In such instances, each can be connected to bus 115 by one or more data media interfaces.

The computer system may also communicate with one or more external devices 102 such as, for example, a keyboard, track ball, mouse, microphone, speaker, a pointing device, a display 104, etc.; one or more devices that enable a user to interact with the computer system, such as for example, a keyboard, track ball, mouse, pointing device, microphone, speaker, etc.; and/or any devices (e.g., network card, modem, etc.) that enable the computer system to communicate with one or more other computing devices. Such communication can occur via Input/Output (I/O) interfaces 106. Communications or network adapter 116 interconnects bus 115 with an outside network 118 enabling the data processing system 100 to communicate with other such systems. Additionally, an operating system such as, for example, AIX ("AIX" is a trademark of the IBM Corporation) is used to coordinate the functions of the various components shown in FIG. 1.

The computer system 100 can communicate with one or more networks 118 such as a local area network (LAN), a general wide area network (WAN), and/or a public network (e.g., the Internet) via network adapter 116. As depicted, network adapter 118 communicates with the other components of computer system via bus 115. It should be understood that although not shown, other hardware and/or software components could be used in conjunction with the computer system. Examples include, but are not limited to: microcode, device drivers, redundant processing units, external disk-drive arrays, RAID systems, tape drives, and data archival storage systems, etc.

A processor may process instructions by executing the instruction in a series of small steps. In some cases, to increase the number of instructions being processed by the processor (and therefore increase the speed of the processor), the processor may be pipelined. Pipelining refers to providing separate stages in a processor where each stage performs one or more of the small steps necessary to execute an instruction. In an example, the pipeline (in addition to other circuitry) may be placed in a portion of the processor referred to as the processor core. Some processors may have multiple processor cores (e.g., multiprocessor system), and in some cases, each processor core may have multiple pipelines. Where a processor core has multiple pipelines, groups of instructions (referred to as issue groups) may be issued to the multiple pipelines in parallel and executed by each of the pipelines in parallel. The pipeline(s) may include multiple stages, such as a decode stage, a dispatch stage, an issue stage, an execution stage, etc. The execution stage may include one or more execution units that process different types of operations as specified by the instructions.

Figure 2:
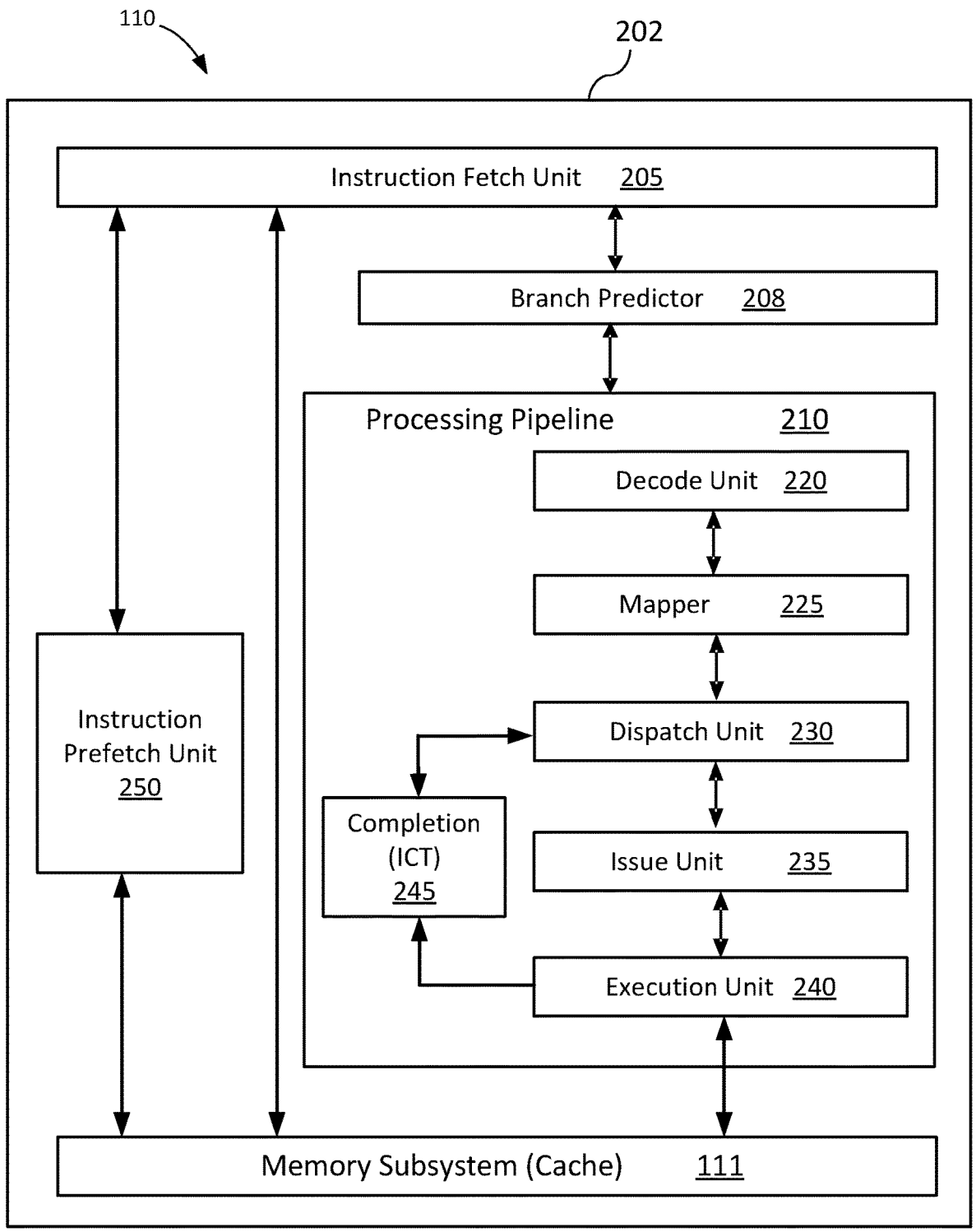
FIG. 2 depicts a block diagram of a processor, processing element, and/or processor core on which the present disclosure may be practiced in accordance with an embodiment.

FIG. 2 depicts a block diagram of a processor core 202 of processor 110 according to an embodiment. The processor core 202 can include an instruction fetch unit 205, a branch predictor 208, a processor pipeline or a processing pipeline 210, an Instruction Prefetch Unit 250, and Cache/Memory 111. The processor core 202 may be included within a computer processor 110 or otherwise distributed within a computer system. Instructions and data can be stored in and fetched from cache/memory 111. Cache/Memory 111 may include any type of volatile or nonvolatile memory, such as cache memory. Cache/Memory 111 can include multiple cache levels. In one embodiment, Cache/Memory 111 includes an instruction cache that can be configured to provide instructions in an 8-way set associative structure. Alternatively, any other desired configuration and size may be employed for the instruction cache, including, for example, an instruction cache implemented as a fully associative, set associative, or direct mapped configuration.

In FIG. 2, a simplified example of the Instruction Fetch Unit (IFU) 205 and the processing pipeline 210 are depicted. In various embodiments, the processor 110 and/or processor core 202 can include multiple processing pipelines 210 and Instruction Fetch Units 205. In an embodiment, the processing pipeline 210 includes a Decode Unit 220, a Mapper 225, a Dispatch Unit 230, an Issue Unit 235, an Execution Unit 240, and an Instruction Completion Table (ICT) 245. In some examples, the Instruction Fetch Unit 205 and/or the Branch Predictor 208 may also be part of the processing pipeline 210. The processing pipeline 210 may also include other features, for example, physical registers, error checking and handling logic, one or more parallel paths through the processing pipeline 210, and other features now or hereafter known in the art. While FIG. 2 illustrates certain interconnections, pathways, and feedback through the processor core 202, other feedback and signaling paths may be included between elements/functional units of the processor core 202.

The Instruction Fetch Unit 205 fetches instructions from Cache/Memory 111 according to an instruction address, for further processing by the Decode Unit 220. The Decode Unit 220 decodes instructions and passes the decoded instructions, portions of instructions, or other decoded data to Mapper 225 and Dispatch Unit 230. The Decode Unit 220 may also detect branch instructions which were not predicted by Branch Predictor 208. The Mapper 225 maps logical registers to physical registers, while the Dispatch Unit 230 tags instructions (ITag), sends a tag (ITag) to the Instruction Completion Table (ICT) 245 for tracking, and issues instructions to Issue Unit 235 generally in order. The Issue Unit 235 analyzes the instructions or other data and transmits the decoded instructions, portions of instructions, or other data, generally out-of-order, to one or more execution units in the Execution Unit 240 based on the analysis. The Execution Unit 240 executes the instructions, and upon execution sends the tag (ITag) of the executed instruction to the Instruction Completion Table (ICT) 245.

Execution Unit 240 may include a plurality of execution units, such as fixed-point execution units, floating-point execution units, load/store execution units (e.g., load store unit denoted as LSU), and vector multimedia execution units to name a few. Write-back logic writes results of instruction execution back to a destination resource. The destination resource may be any type of resource, including registers, cache memory 111, other memory, I/O circuitry to communicate with other devices, other processing circuits, or any other type of destination for executed instructions or data.

In an example, an execution slice may be referred to as a set of data processing circuitry or hardware units connected in series within a processor core. An execution slice may be a pipeline or pipeline-like structure. Multiple execution slices may be used as part of simultaneous multi-threading within a processor core among multiple processor cores of a multiprocessor system. In modern computer architecture, there can be multiple execution units within an execution slice including LSUs, vector-scalar units (VSUs), arithmetic logic units (ALUs), among other execution units.

Branch instructions (or "branches") are types of instructions typically processed and/or handled in processor 110. In an embodiment, processor 110 may perform branch prediction in order to speculatively fetch instructions subsequent to branch instructions. Branch Predictor 208 is included to perform such branch prediction operations. Branch Predictor 208 provides an indication of the instruction address being fetched, so that Branch Predictor 208 may determine which branch target addresses to select for forming a branch prediction. The Branch Predictor 208 may be coupled to various parts of the processing pipeline 210, such as, for example, Execution Unit 240, Decode Unit 220, Mapper 225, etc.

Processor 110 in illustrative embodiment of FIG. 2 also includes an Instruction Prefetch Unit 250. Prefetching is a technique used by computer processors to boost execution performance by fetching instructions or data from their original generally slower memory storage to a faster local memory before it is actually needed. Instruction Prefetch Unit 250 fetches data and instructions into cache/memory 111 before they need to be executed. Instruction Prefetch Unit 250 watches streams of instructions being requested by the executing program, recognizes the next few elements that the program might need based upon the stream, and prefetches the data into the processor Cache/Memory 111.

In an embodiment, the processor 110 can be a SMT processor configured to perform multithreading. In an example, the processor 110 may be a multicore processor including two or more processor cores 202, and each core 202 may be configured to process one or more threads. In an example, each processor core 202 may be configured to process a respective thread. In another example, each processor core 202 may be configured as a multithread processor that can process multiple threads.

Figure 3:
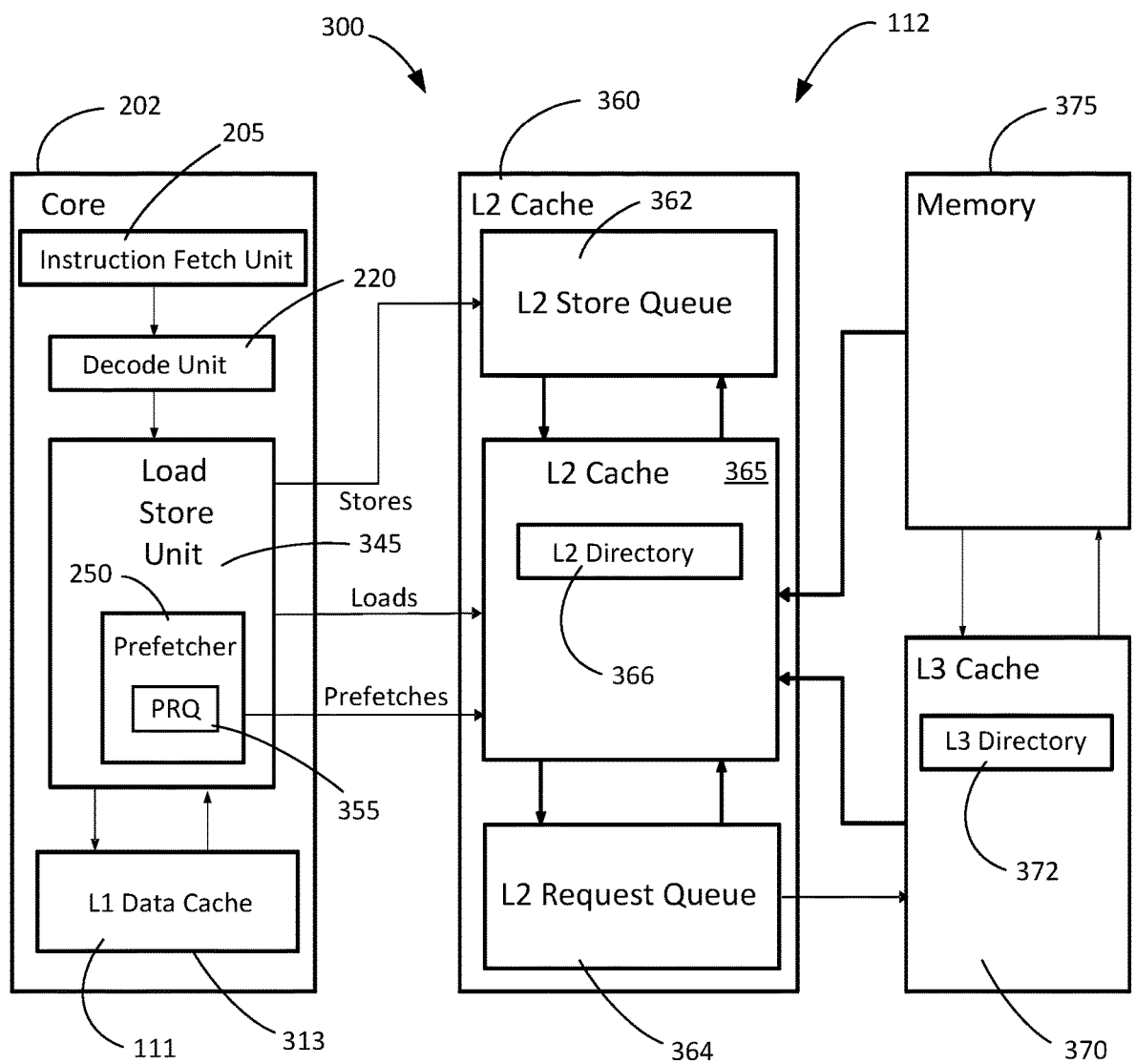
FIG. 3 illustrates portions of a processing system in which certain aspects of the present disclosure may be practiced in accordance with an embodiment.

FIG. 3 illustrates a simplified block diagram of a portion of an information handling system 300 having a processor core 202 that includes an Instruction Fetch Unit (IFU) 205, a decode unit 220, a L1 data cache 313, and an LSU 345 that has a prefetcher 250. Information handling system 300 further includes a memory subsystem 112 that includes an L2 Cache 360, an L3 Cache 370 and memory 375. L2 Cache 360 includes a L2 Store Queue 362, a L2 Request Queue 364, an L2 Cache Array 365 having entries for holding the data, and an L2 Cache Directory 366 for tracking the entries in the L2 Cache Array 365. L3 Cache 370 can be configured similar to L2 Cache 360 and has an L3 Cache Directory 372 for tracking entries in the L3 Cache 370. There are communication links between the various functional units as illustrated in FIG. 3.

The prefetcher 250 in LSU 370 in one or more embodiments is designed and configured to prefetch data referenced in instructions. The prefetcher 250 includes a prefetch request queue (PRQ) 355 that holds information on prefetch streams, e.g., the thread identification, the next expected address, etc. The prefetch unit 250 tracks load and store addresses as they are accessed by the program via the PRQ 355. Loads that miss the cache, e.g., the L1 data cache 313, and which do not appear to be part of an existing stream that the PRQ 355 is already tracking, are eligible for consideration to be added to the PRQ 355 as a potential new stream to track. This process is referred to as allocating, i.e., starting, a new prefetch stream. When prefetch streams are allocated, the address of the next predicted cache line (address) in the prefetch stream, e.g., data or instruction stream, is written into the PRQ 355. The PRQ 355 typically has a number of entries, e.g., eight entries, for tracking the prefetch streams. The decode unit 220, LSU 345 and/or prefetcher 250 will be configured with circuitry and logic to perform the functions as described herein.

It can be appreciated that different levels of cache can be arranged differently in the information handling system 300, on processor core 202, and in memory subsystem 112 than illustrated in FIG. 3. For example, where the processor core 202 has a single data cache 111, also referred to as L1 Data Cache 313 in FIG. 3, the processor core 202 could have multiple cache levels, and different levels of cache can exist in the processor core 202 and/or memory subsystem 112. The system, mechanisms, features, and techniques disclosed would have applicability to these different system and cache level architectures.

For an out-of-order processor, the load and store addresses might be dispatched in sequential program order, however, the load and store addresses may not be executed in sequential order. As the prefetcher 250 typically only sees the execution order of the data/instruction stream, the non-sequential addresses can make it difficult to catch onto and maintain the prefetch stream. In addition, out-of-order access to addresses (cache lines, data) can cause a new prefetch stream to allocate that competes with the already established prefetch stream. Accordingly, the prefetcher 250 may unknowingly allocate a duplicate prefetch stream a few lines apart.

In this scenario where duplicate prefetch streams are allocated, the first prefetch stream first shows up at a cache (e.g., L2 Cache 360) to see if the requested data is present in that data cache (e.g., L2 Cache 360). A search in the data cache directory (e.g., L2 Cache Directory 366) misses in the cache (e.g., L2 Cache 360) because the data is not present in the data cache array (e.g., the L2 Cache Array 365), and a request is sent to the next level of cache (e.g., L3 Cache 370) or memory (e.g., Memory 375). The second (duplicate) prefetch stream that overlaps with the first prefetch stream in some way thereafter shows up at the data cache (e.g., L2 Cache 360). A search is performed in the data cache directory, e.g., L2 Cache Directory 366, and the second (duplicate) prefetch hits in the data cache directory (e.g., L2 Cache Directory 366) or hits the cache resource that is already tracking an existing request for the cache line. As a result of the hit, the second (duplicate) prefetch request is dropped at the level of the cache (e.g., the L2 Cache 360) where it hit. That is, the second (duplicate) prefetch is never sent to memory because the earlier first prefetch request likely was acted upon to bring the data into the cache (e.g., L2 Cache 360) where the second (duplicate) prefetch request hit. The second (duplicate) prefetch request wastes power and processor resources by searching the lower-level cache directory array(s) (e.g., the L2 Cache Directory 366).

Disclosed is a system, mechanism, and/or technique to terminate duplicative prefetch requests and in one or more embodiments reduce unnecessary processing of duplicative prefetch requests, including for example unnecessary searching in cache directories for data responsive to such duplicative prefetch requests. In an embodiment, the system, mechanism and/or technique collects history and makes predictions at the caches (e.g., the L2 cache, L3 cache, and other cache levels) about whether a prefetch request is likely to hit or miss in the cache. If it predicts the prefetch request is likely to hit, then the prefetch request can be ignored, not looked up, or searched in the cache directory, and not sent to memory.

Figure 4:
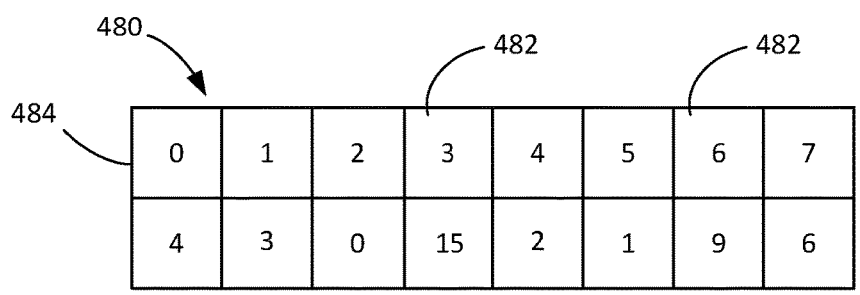
FIG. 4 schematically shows a block diagram of an example embodiment of a streaming filter table on which the present disclosure may be practiced.

FIG. 4 illustrates an example embodiment of the mechanism, e.g., prefetch streaming filter 480, for terminating duplicative prefetch streams, and potentially preventing or reducing looking up or searching caches and/or cache directories for the data requested by the duplicative prefetch request. The prefetch streaming filter 480 has a one or more entries 482, preferably a plurality of entries 482, represented by row 484. The prefetch streaming filter 480 in an embodiment has as many entries 482 as there are entries in the PRQ 355, and in the embodiment of FIG. 4 has eight (8) entries 482. That is, the prefetch streaming filter 480 has as many entries 482 as there are prefetching streams that the core is currently tracking and prefetching. Each prefetch streaming filter entry 482 tracks the number of times, since the last miss, that prefetches associated with that stream have hit in that cache. That is, the prefetch streaming filter 480 tracks per-stream hits and misses. Whenever a prefetch request is received at a cache, the prefetch streaming filter entry 482 associated with that prefetch request is checked to see how many hits have occurred for that prefetch stream. So, for example, in FIG. 4, prefetch streaming filter entry 0 shows four (4) hits; entry 1 shows 3 hits; entry 2 shows 0 hits; entry 3 shows 15 hits; etc.

Depending upon the number of hits for the prefetching stream, as determined by the streaming filter 480, the prefetch stream, e.g., the prefetch request, is probabilistically terminated. Since the number of hits is potentially indicative of earlier requests to the cache, including earlier prefetch stream requests, that brought the data to the cache, if the streaming filter entry 482 has tracked a large number of hits for a given prefetch stream tracked by the PRQ 355, then most of the prefetch requests associated with that stream should be terminated before they access the Cache/memory directory. That is, a determination to terminate a prefetch is made based upon the number of hits as indicated by the streaming filter entry 482 associated with that prefetch request, where the higher the number of hits, the larger the probability that the prefetch request will be terminated.

In an example embodiment, streaming filter 480 will be designed so that: less than (<) four (4) hits will not result in the prefetch request being terminated (<4 hits: 0% chance of termination); 4-8 hits will result in a 50% chance of the prefetch request being terminated (4-8 hits: 50% chance of termination); greater than eight (8) hits will result in 90% chance of the prefetch request being terminated (>8 hits: 90% chance of termination). In the example streaming filter 480 of FIG. 4, entries 1-2, 4-5 will not terminate any prefetches; entries 0, 7 will terminate 50% of the prefetch requests; and entries 3, 6 will terminate 90% of the prefetch requests. In one or more embodiments, at no point should the design terminate all (100%) of the prefetch requests.

In one or more approaches, any miss in a cache resets the counter (sets streaming filter entry 482 for that prefetch stream to zero), and lets all prefetches in that prefetch stream through. So, for example, if a prefetch misses the directory at any level of the cache hierarchy directory, the associated streaming filter entry 482 is cleared so future accesses for that stream are allowed to read the directory and make memory requests. In systems that utilize confidence levels to mark and/or handle prefetch streams, a low confidence prefetch is a good indication of a fresh prefetch allocation (new PRQ entry), and in an embodiment, the arrival of a zero confidence (0-confidence) prefetch (or other low-confidence prefetches) at a streaming filter entry 482 will also clear the hit count in the associated streaming filter entry 482 and let the prefetch request to go through (be processed).

To implement the prefetch streaming filter 480, a stream identifier will need to be added to the prefetch request sent out from the prefetcher 250. In an embodiment, each prefetch request will include a number of bits, e.g., a bit field, to identify the prefetch stream and mark it as related to a specific entry in PRQ 355. In an example, each prefetch request can include 3-6 bits of information to identify the prefetch stream, e.g., mark or tag the prefetch request as related to a specific entry in the PRQ 355. In an aspect, there is a direct mapping of the stream identification to an entry 482 in the streaming filter 480, and no searching of the streaming filter 480 is required.

Figure 5:
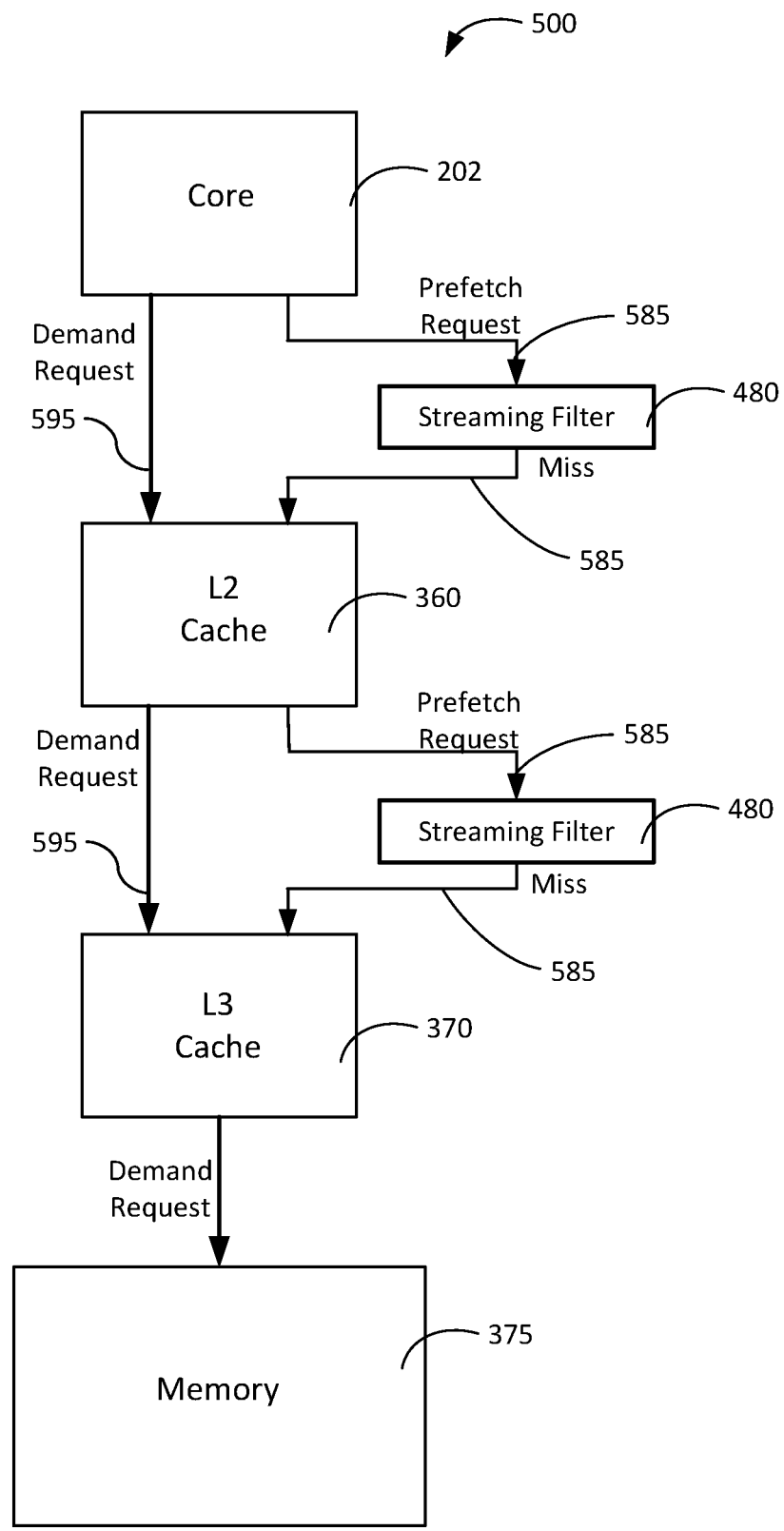
FIG. 5 schematically shows a diagram showing potential location(s) of streaming filter(s) on the path to the L2 and L3 caches according to an embodiment of the present disclosure.

FIG. 5 illustrates an example embodiment of the locations of streaming filters 480 on the path between a processor core 202, L2 Cache 360, L3 Cache 370 and Memory 375. The embodiment of the system 500 illustrates a first streaming filter 480 located between processor core 202 and L2 Cache 360, and a second streaming filter 480 located between L2 Cache 360 and L3 Cache 370, however, a single streaming filter 480 could be utilized and located between the Core 202 and L2 Cache 360 or between the L2 Cache 360 and the L3 Cache 370. It can be appreciated that while the embodiment of FIG. 5 shows a first streaming filter 480 located between processor core 202 and L2 Cache 360, and a second streaming filter 480 located between L2 Cache 360 and L3 Cache 370, different system architectures would utilize streaming filters in different locations.

Figure 6:
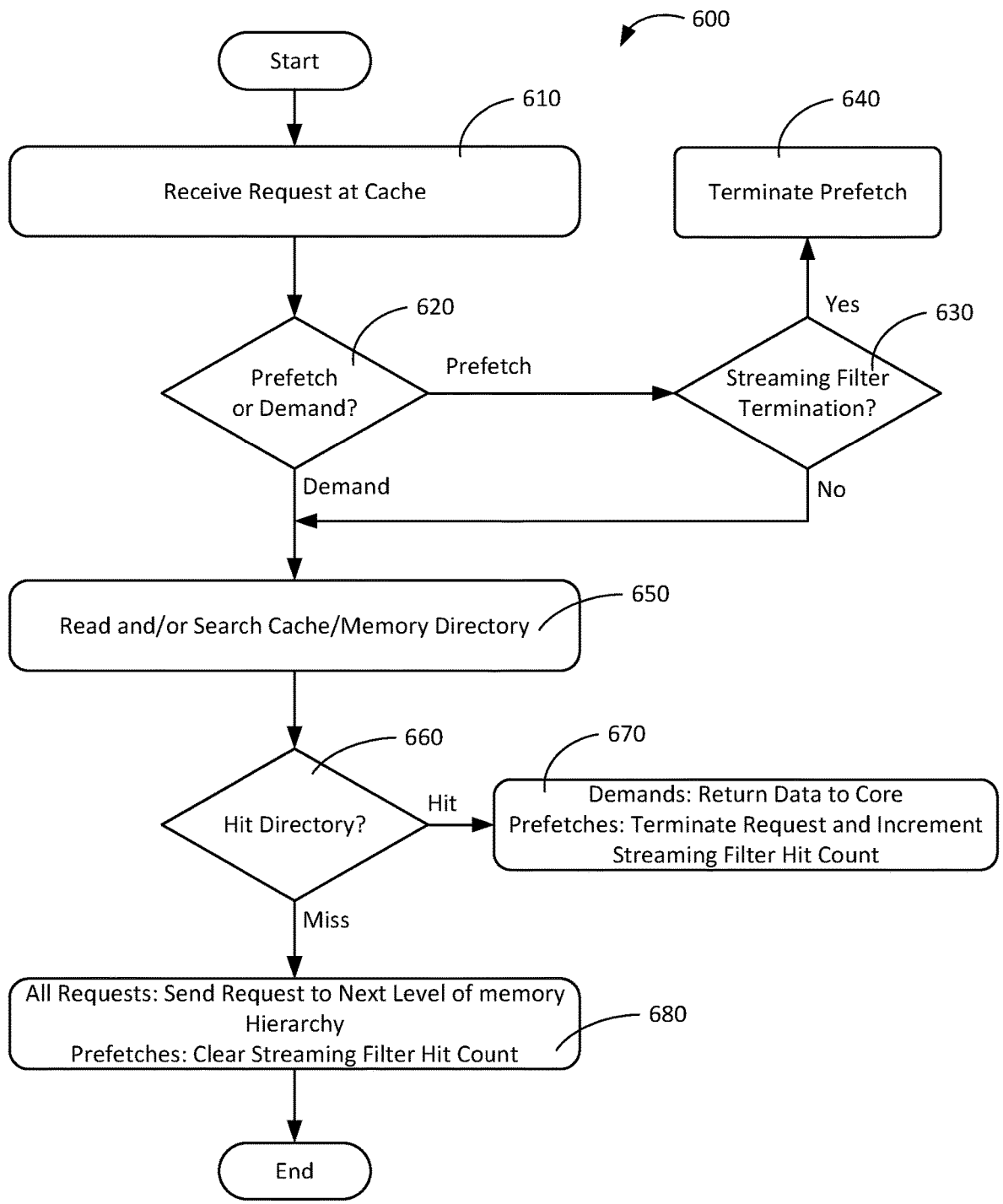
FIG. 6 shows a flow chart of a method of determining whether a request, including a prefetch request, received by a cache should be terminated and/or further processed, according to an embodiment of the disclosure.

FIG. 6 outlines an exemplary flowchart in accordance with various embodiments illustrating and describing a method 600 of prefetching data, including the use of a filter to terminate prefetches, for example to eliminate duplicative prefetches. While the method 600 is described for the sake of convenience and not with an intent of limiting the disclosure as comprising a series and/or a number of steps, it is to be understood that the process 600 does not need to be performed as a series of steps and/or the steps do not need to be performed in the order shown and described with respect to FIG. 6, but the process 600 can be integrated and/or one or more steps can be performed together, simultaneously, or the steps can be performed in the order disclosed or in an alternate order.

Process 600 will be described with reference to the streaming filter 480 of FIG. 4 located between the processor core 202 and the L2 Cache 360 as indicated in FIG. 5. Process 600 starts at 610 where a request is received at a first level of cache outside the processor 202, e.g., L2 Cache 360. It is determined at 620, whether the request is a prefetch request (e.g., prefetch request 585) or a demand request (e.g., demand request 595). If it is determined at 620 that the request received at the cache (e.g., L2 Cache 360) is a demand request (demand request 595) then the demand request (demand request 595) is sent to the L2 cache (e.g., L2 Cache 360). If on the other hand, it is determined at 620 that the request received at the cache (e.g., L2 Cache 360) is a prefetch request (prefetch request 585), then the request (prefetch request 585) is sent the streaming filter (e.g., streaming filter 480).

At 630 it is determined whether the prefetch request (prefetch request 585) should be terminated. In one or more embodiments, a stream identification is added to the prefetch stream and that stream identification (e.g., stream tag or stream Id.) is used to identify an entry 482 in the streaming filter 480. The corresponding entry 482 in the streaming filter 480 is checked for the number of hits, since the last miss in the cache (e.g., the L2 Cache 360), for prefetches associated with that stream. It is then determined according to the probabilistic scale (e.g., algorithm), whether that prefetch should be terminated. So, for the example streaming filter 480 of FIG. 4 having the history as shown, e.g., the number of hits per prefetch stream, the probabilistic filter or algorithm to apply is determined, and the prefetch request is terminated according to that probabilistic scale/algorithm. If at 630 it is determined to terminate the prefetch request (630: Yes), then process 600 continues to 640 where the prefetch request (e.g., prefetch request 585) is terminated. Since the prefetch request is terminated, the Cache Directory (e.g., the L2 Cache Directory 366) is not searched, and the processor saves the power and resources associated with searching the cache directory and/or cache for the data which is the subject of the terminated prefetch request.

If on the other hand, it is determined at 630 that the prefetch request (e.g., prefetch request 585) should not be terminated (630: No), then process 600 proceeds to 650 where the prefetch request is sent to the cache (e.g., L2 Cache 360). At 650 the cache or memory directory is read, e.g., the L2 Cache Directory 366, to determine whether the data that is the subject of the request (e.g., prefetch request 585 or demand request 595) is contained in the cache (e.g., the L2 Cache Array 365). In one or more embodiments, the cache or memory directory (e.g., the L2 Cache Directory 366) is searched to determine whether the data that is the subject of the request is contained in the cache (e.g., L2 Cache 365). At 660 it is determined whether there is a hit in the cache or memory directory (e.g., L2 Cache Directory 366). Determining whether there is a hit in the cache or memory directory can involve one or more of reading out entries in the cache or memory directory, searching for entries in the cache or memory directory, and/or making comparisons to determine whether there is a match, e.g., a hit, in the cache or memory directory. Determining whether there is a hit in the cache or memory directory can be determined in any number of ways, and in one or more embodiments, determining whether there is a hit in the cache or memory directory can be substituted by determining whether the data that is the subject of the request received at the cache or memory is contained within the cache or memory.

If at 660 it is determined that there is a hit in the cache (or memory) directory (e.g., L2 Cache Directory 366) or in the cache or memory (e.g., L2 Cache Array 365) (660: Yes), then the process 600 proceeds to 670. At 670, if the request to the cache or memory was a demand request 595, then the data is returned to the processor core 202 (e.g., to L1 Cache 313), since a hit indicates the data is in the cache or memory. If the request to the cache or memory was a prefetch request 585, then at 670 prefetch request 585 is terminated and the streaming filter count for the corresponding entry 482 in the streaming filter 480 is incremented.

If at 660 it is determined that there is a miss in the cache (or memory) directory (e.g., L2 Cache Directory) or in the cache or memory (e.g., L2 Cache 365) (660: No), then the process 600 proceeds to 680. At 680, if the request to the cache or memory was a prefetch request 585, then at 680 the filter hit count in the corresponding entry 482 in the streaming filter 480 is cleared (e.g., set to 0), and the prefetch request is sent onto the next level of memory hierarchy (e.g., L3 Cache 370), where process 600 in an embodiment will be implemented and undertaken again using the streaming filter between the L2 Cache 360 and the L3 Cache 370. At 680, if the request to the cache or memory was a demand request 595 the demand request is sent to the next level of memory hierarchy (e.g., sent to L3 Cache 370), where process 600 in an embodiment will be implemented and undertaken again using the streaming filter between the L2 Cache 360 and the L3 Cache 370. In this manner streaming filter 480 and process 600 can be implemented at various locations between and/or at different levels of the memory hierarchy to increase the efficiency of prefetching, particularly in an out of order processor.

It will be understood that one or more blocks of the flowchart illustrations in FIG. 6, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions, and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

One or more embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

The corresponding structures, materials, acts, and equivalents of all means or step plus function elements in the claims below are intended to include any structure, material, or act for performing the function in combination with other claimed elements as specifically claimed. The description of the embodiments of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The embodiments and examples were chosen and described in order to best explain the principles of the disclosure and the practical application, and to enable others of ordinary skill in the art to understand the disclosure for various embodiments with various modifications as are suited to the particular use contemplated.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

It will be clear that the various features of the foregoing systems and/or methodologies may be combined in any way, creating a plurality of combinations from the descriptions presented above.

It will be further appreciated that embodiments of the present disclosure may be provided in the form of a service deployed on behalf of a customer to offer service on demand.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of processing data in a processor to reduce duplicative prefetch requests, the method comprising:
   receiving a request for data at a cache;
   identifying whether the request for data received at the cache is a demand request or a prefetch request; and
   determining, in response to identifying that the request for data received at the cache is a prefetch request, whether to terminate the prefetch request,
   wherein determining whether to terminate the prefetch request comprises:
      determining how many hits have occurred for a prefetch stream corresponding to the prefetch request received at the cache; and
      determining, based upon the number of hits that have occurred for the prefetch stream corresponding to the prefetch request received by the cache, whether to terminate the prefetch request.

2. The method of claim 1, wherein determining whether to terminate the prefetch request is based upon a probabilistic scale where the greater the number of hits for the prefetch stream corresponding to the prefetch request, the more likely the prefetch request is terminated.

3. The method of claim 2, wherein the probabilistic scale never terminates all the prefetch requests.

4. The method of claim 1, wherein the prefetch request is terminated before a search in the cache or in a cache directory for the cache.

5. The method of claim 1, further comprising identifying, in response to allocating a prefetch stream, the allocated prefetch stream with a prefetch stream identification.

6. The method of claim 1, wherein determining how many hits have occurred for the prefetch stream corresponding to the prefetch request received at the cache comprises:
checking a streaming filter to determine the number of hits that have occurred for the prefetch stream corresponding to the prefetch request.

7. The method of claim 1, further comprising identifying, in response to allocating a prefetch stream, the allocated prefetch stream with a prefetch stream identification,
wherein determining how many hits occurred for the prefetch stream corresponding to the prefetch request received at the cache comprises:
checking a streaming filter to determine the number of hits that have occurred for the prefetch stream corresponding to the prefetch request, wherein the streaming filter contains a plurality of entries where each entry corresponds to one of a plurality of prefetch streams and each entry tracks the number of hits that have occurred for its corresponding prefetch stream.

8. The method of claim 7, wherein checking the streaming filter to determine the number of hits that have occurred for the prefetch stream corresponding to the prefetch request comprises using the prefetch stream identification to identify the entry in the streaming filter to look-up for the number of hits that have occurred for the prefetch stream corresponding to the prefetch request.

9. The method of claim 1, further comprising determining whether data responsive to the demand request or prefetch request is in the cache.

10. The method of claim 9, wherein determining whether data responsive to the prefetch request is in the cache comprises reading, in response to not terminating the prefetch request, a cache directory for the cache.

11. The method of claim 10, wherein determining whether data responsive to the demand request is in the cache comprises reading, in response to determining that the request is a demand request and not a prefetch request, the cache directory for the cache.

12. The method of claim 1, further comprising determining whether the prefetch request or a demand request hits in a cache directory for the cache.

13. The method of claim 9, further comprising:
sending, in response to determining data responsive to the demand request is in the cache, the data to a processor core; and
terminating, in response to determining data responsive to the prefetch request is in the cache, the prefetch request and incrementing a hit count for a prefetch stream corresponding to the prefetch request.

14. The method according to claim 9, further comprising:
sending, in response to determining data responsive to the demand request is not in the cache, the demand request to a next level of memory in a memory hierarchy; and
in response to determining data responsive to the prefetch request is not in the cache, setting the hit count for a prefetch stream corresponding to the prefetch request to zero and sending the prefetch request to the next level of memory in the memory hierarchy.

15. The method of claim 14, further comprising:
identifying whether the request for data received at the next level of memory in the memory hierarchy is a demand request or a prefetch request; and
determining, in response to identifying the request for data received at the next level of memory in the memory hierarchy is a prefetch request, whether to terminate the prefetch request received at the next level of memory in the memory hierarchy,
wherein determining whether to terminate the prefetch request received at the next level of memory in the memory hierarchy comprises:
determining how many hits have occurred for the prefetch request stream corresponding to the prefetch request received at the next level of memory in the memory hierarchy;
determining, based upon the number of hits that have occurred for the prefetch stream corresponding to the prefetch request received at the next level of memory in the memory hierarchy, whether to terminate the prefetch request.

16. A system for processing data comprising:
a processor comprising:
a cache memory for holding data;
a prefetch unit for prefetching data into the cache memory, the prefetch unit having a prefetch request queue (PRQ) for tracking one or more prefetch streams;
a memory subsystem for storing data, the memory subsystem having one or more data caches and a main memory; and
a prefetch streaming filter having a number of entries, each entry for tracking a number of times that one of the one or more prefetch streams have hit in one of the one or more data caches,
wherein the system is configured to:
identify, in response to allocating a prefetch stream, the prefetch stream with a prefetch stream identification;
receive a request for data at a data cache;
identify whether the request for data received at the data cache is a demand request or a prefetch request from a prefetch stream; and
determine, in response to identifying that the request for data received at the data cache is a prefetch request, whether to terminate the prefetch request to reduce duplicative prefetch requests,
wherein determining whether to terminate the prefetch request to reduce duplicative prefetch requests comprises checking an entry in the prefetch streaming filter for the number of hits that have occurred for the prefetch stream corresponding to the prefetch request received at the data cache.

17. The system of claim 16, wherein the number of entries in the prefetch streaming filter is equal to a number of entries in the PRQ and each entry in the prefetch streaming filter corresponds to a prefetch stream identification, wherein the streaming filter is located in an instruction processing path after the processor and at least one of a group consisting of: before the data cache; and at a front end of the data cache before a data cache directory for the data cache.

18. The system of claim 16, wherein determining whether the prefetch request should be terminated further comprises the system configured to:
determine, based upon the number of hits that have occurred for the prefetch stream corresponding to the prefetch request received by the data cache, whether to terminate the prefetch request based upon a probabilistic scale where the greater the number of hits for the prefetch stream corresponding to the prefetch request, the more likely the prefetch request is terminated.

19. The system of claim 16, wherein the system is further configured to:

determine whether data responsive to the demand request or the prefetch request is in the data cache;

sending, in response to determining that data responsive to the demand request is in the cache, the data to a higher level cache in the cache memory or a load store unit in the processor;

terminating, in response to determining that data responsive to the prefetch request is in the data cache; the prefetch request and incrementing a hit count in the entry of the prefetch streaming filter for the prefetch stream corresponding to the prefetch request;

sending, in response to determining that data responsive to the demand request is not in the data cache, the demand request to a next level of memory in the memory subsystem; and in response to determining that data responsive to the prefetch request is not in the data cache, setting the hit count to zero in the entry of the prefetch streaming filter for the prefetch stream corresponding to the prefetch request and sending the prefetch request to the next level of memory in the memory subsystem.

20. A prefetch streaming filter for a computing system, the prefetch streaming filter comprising a plurality of entries for storing data, each entry corresponding to an allocated prefetch stream out of a plurality of prefetch streams being prefetched and tracked and storing a count of a number of times a prefetch request corresponding to the allocated prefetch stream hits in a data cache, where a hit in the data cache indicates data associated with the prefetch request is in the data cache, wherein the count in an entry in the prefetch steaming filter is incremented in response to a prefetch request hitting in the data cache, and the count in the entry in the prefetch streaming filter is reset to zero in response to the prefetch request missing in the data cache, where missing in the data cache indicates that data associated with the prefetch request is not in the data cache.

* * * * *